US011359075B2

(12) United States Patent
Nakagawa et al.

(10) Patent No.: US 11,359,075 B2
(45) Date of Patent: Jun. 14, 2022

(54) RUBBER COMPOSITION FOR A TIRE TREAD AND PNEUMATIC TIRE USING THE SAME

(71) Applicant: The Yokohama Rubber Co., LTD., Tokyo (JP)

(72) Inventors: Ryutaro Nakagawa, Hiratsuka (JP); Hiroki Sugiura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 184 days.

(21) Appl. No.: 16/477,863

(22) PCT Filed: Jan. 12, 2018

(86) PCT No.: PCT/JP2018/000725

§ 371 (c)(1),
(2) Date: Jul. 12, 2019

(87) PCT Pub. No.: WO2018/131694

PCT Pub. Date: Jul. 19, 2018

(65) Prior Publication Data

US 2020/0123346 A1 Apr. 23, 2020

(30) Foreign Application Priority Data

Jan. 12, 2017 (JP) ............................ JP2017-003516

(51) Int. Cl.

| | |
|---|---|
| ***C08L 7/00*** | (2006.01) |
| ***C08L 15/00*** | (2006.01) |
| ***B60C 1/00*** | (2006.01) |
| ***C08C 19/25*** | (2006.01) |
| ***C08K 3/36*** | (2006.01) |
| ***C08K 9/10*** | (2006.01) |
| ***C08L 71/00*** | (2006.01) |
| ***C08L 83/04*** | (2006.01) |

(52) U.S. Cl.

CPC .............. *C08L 7/00* (2013.01); *B60C 1/0016* (2013.01); *C08C 19/25* (2013.01); *C08K 3/36* (2013.01); *C08K 9/10* (2013.01); *C08L 15/00* (2013.01); *C08L 71/00* (2013.01); *C08L 83/04* (2013.01); *C08K 2201/003* (2013.01); *C08L 2205/03* (2013.01); *C08L 2205/20* (2013.01); *C08L 2312/08* (2013.01)

(58) Field of Classification Search

CPC .......... C08L 17/00; C08L 115/00; C08L 7/00; C08L 15/00; B60C 1/0016

See application file for complete search history.

(56) References Cited

U.S. PATENT DOCUMENTS

| | | | | |
|---|---|---|---|---|
| 6,550,508 | B1 * | 4/2003 | Yamaguchi | C08L 7/00 152/167 |
| 9,951,210 | B2 * | 4/2018 | Kakubo | C08L 101/00 |
| 2006/0167160 | A1 | 7/2006 | Nakagawa et al. | |
| 2011/0144236 | A1 | 6/2011 | Mihara | |
| 2013/0267646 | A1 * | 10/2013 | Kameda | C08K 3/36 524/526 |
| 2013/0338255 | A1 | 12/2013 | Naka et al. | |
| 2014/0100321 | A1 | 4/2014 | Maejima et al. | |
| 2015/0031791 | A1 | 1/2015 | Sugiura | |
| 2015/0099844 | A1 | 4/2015 | Takeda et al. | |
| 2015/0126643 | A1 | 5/2015 | Satou et al. | |
| 2016/0009846 | A1 | 1/2016 | Sato et al. | |
| 2016/0237253 | A1 | 8/2016 | Kakubo et al. | |
| 2017/0362415 | A1 | 12/2017 | Iizuka | |

FOREIGN PATENT DOCUMENTS

| | | |
|---|---|---|
| EP | 1 914 245 | 4/2008 |
| EP | 2 960 288 | 12/2015 |
| EP | 3 040 374 | 7/2016 |
| JP | 2003-253051 | 9/2003 |
| JP | 2009-179754 | 8/2009 |
| JP | 2009-286822 | 12/2009 |
| JP | 2010-155935 | 7/2010 |
| JP | 2014-173062 | 9/2014 |
| JP | 2015-067636 | 4/2015 |
| JP | 2016-108428 | 6/2016 |
| JP | 2016-145340 | 8/2016 |
| WO | WO 2004/000931 | 12/2003 |
| WO | WO 2007/018018 | 2/2007 |
| WO | WO 2012/073841 | 6/2012 |
| WO | WO 2012/144605 | 10/2012 |
| WO | WO 2013/122237 | 8/2013 |
| WO | WO 2013/133432 | 9/2013 |
| WO | WO 2013/157545 | 10/2013 |
| WO | WO 2014/129665 | 8/2014 |
| WO | WO 2015/046154 | 4/2015 |
| WO | WO 2016/088811 | 6/2016 |

OTHER PUBLICATIONS

Machine translation JP 2010-155935 A, published Jul. 15, European Search Report for European Application No. 18738629.7 dated Jul. 7, 2020, 8 pages, Germany.
International Search Report for International Application No. PCT/JP2018/000725 dated Feb. 27, 2018, 4 pages, Japan. 2010.*

* cited by examiner

*Primary Examiner* — Vickey Nerangis
(74) *Attorney, Agent, or Firm* — Thorpe North & Western

(57) ABSTRACT

A rubber composition for a tire tread contains a diene rubber, silica, and a cured product; a content of the silica being from 20 to 100 parts by mass per 100 parts by mass of the diene rubber, a content of the cured product being from 0.3 to 30 parts by mass per 100 parts by mass of the diene rubber; the diene rubber containing a natural rubber and a modified butadiene rubber having a polyorganosiloxane group at a terminal, a content of the natural rubber in the diene rubber being from 30 to 90 mass %, a content of the modified butadiene rubber in the diene rubber being from 10 to 70 mass %; the cured product being a cured product obtained by curing a crosslinkable oligomer or polymer that is incompatible with the diene rubber; and a JIS A hardness of the cured product being from 3 to 45.

16 Claims, 1 Drawing Sheet

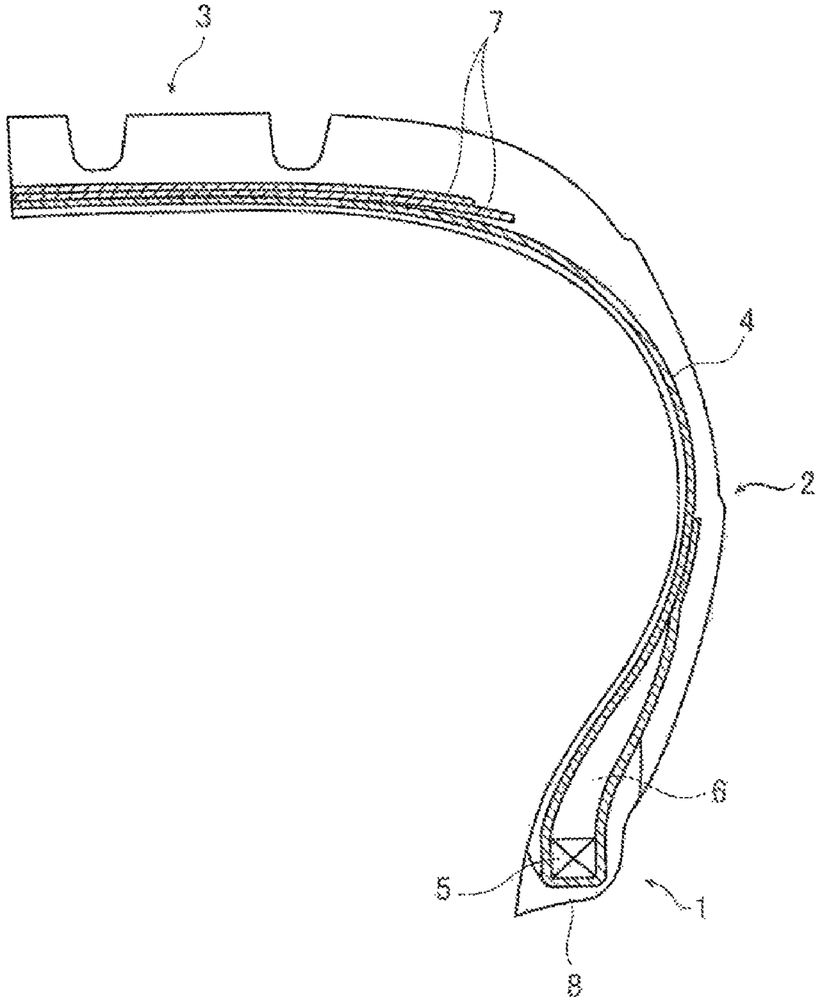
3
7
4
2
6
5
1
8

RUBBER COMPOSITION FOR A TIRE TREAD AND PNEUMATIC TIRE USING THE SAME

TECHNICAL FIELD

The present technology relates to a rubber composition for a tire tread and a pneumatic tire.

BACKGROUND ART

In the related art, rubber compositions for tires that are used in tire treads of studless tires have been known. For example, claim 1 of Japan Unexamined Patent Publication No. 2015-067636 describes "a rubber composition for a tire comprising: 100 parts by mass of a diene rubber (A); from 30 to 100 parts by mass of a carbon black and/or a white filler (B); and from 0.3 to 30 parts by mass of a cured product (C) obtained by curing a crosslinkable oligomer or polymer (c1) that is not compatible with the diene rubber (A); JIS A hardness of the cured product (C) being from 3 to 45".

When the present inventors studied the rubber composition for a tire described in Japan Unexamined Patent Publication No. 2015-067636, it was found that at least one of performance on ice (frictional force on ice), wet grip performance, a low heat build-up, or wear resistance may be insufficient.

SUMMARY

The present technology provides a rubber composition for a tire tread that exhibits excellent performance on ice, wet grip performance, low heat build-up, and wear resistance when formed into a tire; and a pneumatic tire which uses this rubber composition for a tire tread in a tread.

Specifically, the present technology provides the following [1] to [7].

[1] A rubber composition for a tire tread containing: a diene rubber, silica, and a cured product; a content of the silica being from 20 to 100 parts by mass per 100 parts by mass of the diene rubber, a content of the cured product being from 0.3 to 30 parts by mass per 100 parts by mass of the diene rubber; the diene rubber containing a natural rubber and a modified butadiene rubber having a polyorganosiloxane group at a terminal, a content of the natural rubber in the diene rubber being from 30 to 90 mass %, a content of the modified butadiene rubber in the diene rubber being from 10 to 70 mass %; and the cured product being a cured product obtained by curing a crosslinkable oligomer or polymer that is incompatible with the diene rubber, JIS (Japanese Industrial Standard) A hardness of the cured product being from 3 to 45.

[2] The rubber composition for a tire tread according to [1] above, where the polyorganosiloxane group is a group bonded to a terminal of a butadiene chain through a linking group formed from a divalent hydrocarbon group from 1 to 20 carbons which may have a substituent or through an ether group.

However, a part of $—CH_2—$ of the divalent hydrocarbon group from 1 to 20 carbons which may have a substituent may be replaced by —O—.

Furthermore, a silicon-containing linking group represented by General Formula (Si) described below may be present in between the linking group formed from a divalent hydrocarbon group from 1 to 20 carbons which may have a substituent; and the terminal of the butadiene chain.

[3] The rubber composition for a tire tread according to [1] or [2] above, where the cured product has particles having an average particle diameter of from 5 to 250 μm.

[4] The rubber composition for a tire tread according to any one of [1] to [3] above, where the crosslinkable oligomer or polymer is a polyether-based or siloxane-based polymer or copolymer and has a silane functional group.

[5] The rubber composition for a tire tread according to any one of [1] to [4] above, further containing an aromatic modified terpene resin having a softening point of from 60 to 150° C., where a content of the aromatic modified terpene resin is from 2 to 20 parts by mass per 100 parts by mass of the diene rubber.

[6] The rubber composition for a tire tread according to any one of [1] to [5] above, further containing thermally expanding microcapsules, where a content of the thermally expanding microcapsules is from 0.5 to 20 parts by mass per 100 parts by mass of the diene rubber.

[7] A pneumatic tire including the rubber composition for a tire tread described in any one of [1] to [6] above in a tread.

The present technology can provide a rubber composition for a tire tread that exhibits excellent performance on ice, wet grip performance, low heat build-up, and wear resistance when formed into a tire; and a pneumatic tire which uses this rubber composition for a tire tread in a tread.

BRIEF DESCRIPTION OF DRAWINGS

FIG. 1 is a partial cross-sectional schematic view of a tire that represents a pneumatic tire according to an embodiment of the present technology.

DETAILED DESCRIPTION

Hereinafter, a rubber composition for a tire tread according to an embodiment of the present technology and a pneumatic tire that uses the rubber composition for a tire tread described in an embodiment of the present technology in a tread will be described.

In the present specification, numerical ranges indicated using "(from) . . . to . . . " include the former number as the lower limit value and the latter number as the upper limit value.

Rubber Composition for Tire Tread

The rubber composition for a tire tread according to an embodiment of the present technology (hereinafter, also referred to as "composition according to an embodiment of the present technology") is a rubber composition for a tire tread containing: a diene rubber, silica, and a cured product; a content of the silica being from 20 to 100 parts by mass per 100 parts by mass of the diene rubber; a content of the cured product being from 0.3 to 30 parts by mass per 100 parts by mass of the diene rubber; the diene rubber containing a natural rubber and a modified butadiene rubber having a polyorganosiloxane group at a terminal; a content of the natural rubber in the diene rubber being from 30 to 90 mass %; a content of the modified butadiene rubber in the diene rubber being from 10 to 70 mass %; and the cured product being a cured product obtained by curing a crosslinkable oligomer or polymer that is incompatible with the diene rubber; JIS A hardness of the cured product being from 3 to 45.

The composition according to an embodiment of the present technology is thought to achieve desired effects as a result of having such a configuration. Although the reason is not clear, it is assumed to be as follows.

As described above, the composition according to an embodiment of the present technology contains a diene rubber containing a natural rubber and a specific modified butadiene rubber, silica, and a specific cured product. From the study of the present inventors, it was found that, although the specific cured product exhibits effects to improve performance on ice, the specific cured product tends to aggregate and in particular, when the content of the silica is high, this tendency is increased, and a low heat build-up and wear resistance are deteriorated.

On the other hand, in the composition according to an embodiment of the present technology, it is conceived that a modified terminal of the specific modified butadiene rubber interacts with the cured product and suppresses the aggregation thereof.

As a result, it is presumed that the tire using the composition according to an embodiment of the present technology exhibits an excellent low heat build-up and wear resistance in addition to excellent performance on ice and wet grip performance.

Each of the components contained in the composition according to an embodiment of the present technology will be described in detail below.

Diene Rubber

The diene rubber contained in the composition according to an embodiment of the present technology contains a natural rubber and a modified butadiene rubber having a polyorganosiloxane group at a terminal.

Natural Rubber

The natural rubber contained in the diene rubber is not particularly limited.

The content of the natural rubber in the diene rubber is from 30 to 90 mass %, preferably from 30 to 85 mass %, and more preferably from 35 to 80 mass %.

Modified Butadiene Rubber

The modified butadiene rubber contained in the diene rubber is a modified butadiene rubber having a polyorganosiloxane group at a terminal.

The modified butadiene rubber has polybutadiene (butadiene rubber) which is a conjugated diene-based polymer chain as a main chain and has a polyorganosiloxane group at a terminal of the main chain.

Preferred examples of the polyorganosiloxane group include groups derived from the polyorganosiloxane (modifying agent) described in step (B) described below.

Furthermore, the modified butadiene rubber may have a group derived from a silicon compound (coupling agent) described in step (A) described below between the main chain (butadiene chain) and the polyorganosiloxane group.

Furthermore, bonding between the main chain (butadiene chain) and the polyorganosiloxane group is preferably a bond other than a bond through a nitrogen atom, from the perspectives of suppressing excessive progression of the reaction between silica and a silane coupling agent described below and having excellent processability of the composition.

From the perspective of achieving excellent processability of the composition, the polyorganosiloxane group is preferably a group bonded to a terminal of a butadiene chain through a linking group formed from a divalent hydrocarbon group from 1 to 20 carbons which may have a substituent (hereinafter, also referred to as "hydrocarbon-based linking group") or through an ether group and more preferably a group bonded to a terminal of a butadiene chain through the hydrocarbon-based linking group.

Examples of the hydrocarbon-based linking group include a polymethylene group having from 1 to 20 carbons ($(CH_2)_k$ (k is an integer from 1 to 20)), an arylene group having from 6 to 20 carbons, and a cycloalkylene group having from 5 to 20 carbons.

Furthermore, in the hydrocarbon-based linking group, a part of $—CH_2—$ constituting the hydrocarbon-based linking group may be replaced by —O—.

The number of the $—CH_2—$ moieties replaced by —O— in the hydrocarbon-based linking group is not particularly limited as long as the number is not the total number of the $—CH_2—$ moieties and is preferably from 1 to 5 and more preferably from 1 to 2.

Furthermore, a group derived from a silicon compound (coupling agent) described in step (A) described below is preferably included between the hydrocarbon-based linking group or ether group and the terminal of the butadiene chain. The group derived from the silicon compound (coupling agent) is preferably a silicon-containing linking group represented by General Formula (Si). Details of the silicon-containing linking group described above will be described below.

The hydrocarbon-based linking group is preferably a group represented by General Formula (C) below.

$$*a\text{-}Y\text{-}*b \qquad (C)$$

In General Formula (C),

Y is a polymethylene group from 1 to 20 carbons which may have a substituent; or an ether group.

One or more $—CH_2—$ moieties in the polymethylene group (preferably from 1 to 5, more preferably from 1 to 2) may be each independently replaced by —O—. However, the number of the $—CH_2—$ moieties replaced by —O— is not the total number of the $—CH_2—$ moieties.

Furthermore, an atom directly bonded to *a in the polymethylene group (that is, an atom directly bonded to the silicon atom in the polyorganosiloxane group) is preferably a carbon atom.

Y is preferably a polymethylene group from 1 to 20 carbons which may have a substituent.

*a is a linkage position with the silicon atom in the polyorganosiloxane group.

*b is the linkage position with the group derived from a silicon compound (coupling agent) described in the step (A) (preferably *1 in General Formula (Si) described below) or with the butadiene chain terminal.

The groups derived from a silicon compound (coupling agents) described in the step (A) may be present in a continuous manner with these groups bonded together.

The group derived from a silicon compound (coupling agents) described in the step (A) is preferably a silicon-containing linking group represented by General Formula (Si) below.

$$*1\text{-}Q^1\text{-}Si(R^{L1})_2\text{-}A^1\text{-}Si(R^{L2})_2\text{-}Q^2\text{-}*2 \qquad (Si)$$

In General Formula (Si), $Q^1$ and $Q^2$ are each independently a chemical single bond or —O—.

$R^{L1}$ and $R^{L2}$ are each independently a substituent, and a plurality of $R^{L1}$ and $R^{L2}$ may be the same or different, respectively.

$A^1$ is a chemical single bond, a polymethylene group having from 1 to 20 carbons ($(CH_2)_k$ (k is an integer from 1 to 20)), an arylene group having from 6 to 20 carbons, or a cycloalkylene group having from 5 to 20 carbons.

*1 is a linkage position with *2 in another silicon-containing linking group or with the hydrocarbon-based linking group (preferably *b in General Formula (C)).

*2 is a linkage position with *1 in another silicon-containing linking group or with the terminal of the butadiene chain.

In other words, in the modified butadiene rubber, the butadiene chain and the polyorganosiloxane group are preferably bonded in a form represented by the following formula. The processability of the composition according to an embodiment of the present technology is improved by the use of such a modified butadiene rubber.

(silicon atom in polyorganosiloxane group)-(hydrocarbon-based linking group or ether group)-(group derived from silicon compound described in step (A))$_x$-(butadiene chain terminal)

In the formula above, x is an integer of 0 or greater, preferably from 0 to 10, and more preferably 0 or 1. In the case where x is 0, -(group derived from silicon compound described in step (A))$_x$— is a chemical single bond.

The above-described "-(hydrocarbon-based linking group or ether group)-" is preferably "-(hydrocarbon-based linking group)-".

The hydrocarbon-based linking group is preferably a group represented by General Formula (C) above.

The group derived from a silicon compound described in the step (A) is preferably a silicon-containing linking group represented by General Formula (Si) above.

Note that, in the formula above, bonding to a group other than the hydrocarbon-based linking group at a silicon atom in the polyorganosiloxane group is omitted. Similarly, bonding to a group other than the group derived from a silicon compound described in the step (A) (or hydrocarbon-based linking group) at the butadiene chain terminal is omitted.

The content of the modified butadiene rubber in the diene rubber is from 10 to 70 mass %, preferably from 15 to 70 mass %, and more preferably from 20 to 70 mass %.

The method for manufacturing the modified butadiene rubber will be described below.

More specifically, a preferred aspect of the method for manufacturing a composition containing the modified butadiene rubber (hereinafter, also referred to as "composition S") will be described.

Preferred Aspect of Method for Manufacturing Composition S Containing Modified Butadiene Rubber The method for manufacturing the composition S containing the modified butadiene rubber is preferably, for example, a method for manufacturing the composition S including mixing a solution containing a conjugated diene-based polymer chain having an active terminal obtained by polymerizing at least conjugated diene monomers by using a polymerization initiator in an inert solvent; with a silicon compound having 6 or more reaction sites that can react with the active terminal of the conjugated diene-based polymer chain having the active terminal per molecule; and a polyorganosiloxane having from 3 to 200 functional groups that can react with the active terminal of the conjugated diene-based polymer chain having the active terminal per molecule.

Conjugated Diene-Based Polymer Chain Having Active Terminal

In the method for manufacturing the composition S, first, at least conjugated diene monomers are polymerized by using a polymerization initiator in an inert solvent to obtain a solution containing a conjugated diene-based polymer chain having an active terminal.

The conjugated diene monomer is butadiene.

Examples of the butadiene include 1,3-butadiene, isoprene (2-methyl-1,3-butadiene), 2,3-dimethyl-1,3-butadiene, 2-chloro-1,3-butadiene, and the like. Among these, 1,3-butadiene is preferred.

A single conjugated diene monomer may be used alone, or a combination of two or more conjugated diene monomers may be used.

In addition to the conjugated diene monomer, an aromatic vinyl monomer may be used.

As the aromatic vinyl monomer, for example, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, dimethylaminoethylstyrene, and the like can be used.

Among these, styrene, α-methylstyrene, and 4-methylstyrene are preferred, and styrene is more preferred.

A single aromatic vinyl monomer may be used alone, or a combination of two or more aromatic vinyl monomers may be used.

The conjugated diene-based polymer chain having an active terminal is preferably a homopolymer chain of conjugated diene monomers or a copolymer chain of a conjugated diene monomer and an aromatic vinyl monomer and is more preferably a homopolymer chain of conjugated diene monomers.

The conjugated diene-based polymer chain preferably contains from 50 to 100 mass %, more preferably from 60 to 100 mass %, and even more preferably from 70 to 100 mass % of conjugated diene monomer units and also preferably contains from 50 to 0 mass %, more preferably from 40 to 0 mass %, and even more preferably from 30 to 0 mass %, of aromatic vinyl monomer units.

Furthermore, in a range that does not impair the intended purpose, another monomer besides the conjugated diene monomers and aromatic vinyl monomers may be used as desired.

Examples of other monomers include α- and β-unsaturated nitriles such as acrylonitrile and methacrylonitrile; unsaturated carboxylic acids or acid anhydrides such as acrylic acid, methacrylic acid, and maleic anhydride; unsaturated carboxylic acid esters such as methyl methacrylate, ethyl acrylate, and butyl acrylate; non-conjugated dienes such as 1,5-hexadiene, 1,6-heptadiene, 1,7-octadiene, dicyclopentadiene, and 5-ethylidene-2-norbornene; and the like.

The amount of these monomers is preferably 10 mass % or less and more preferably 5 mass % or less, in terms of the amount of the monomer unit, in the conjugated diene-based polymer chain having an active terminal.

The inert solvent used in polymerization of the monomers is not particularly limited as long as the inert solvent is an inert solvent that is normally used in solution polymerization and that does not hinder the polymerization reaction.

Specific examples include aliphatic hydrocarbons such as butane, pentane, hexane, and 2-butene; alicyclic hydrocarbons such as cyclopentane, cyclohexane, and cyclohexene; aromatic hydrocarbons such as benzene, toluene, and xylene; and the like.

The used amount of the inert solvent is an amount that makes the monomer concentration to be typically from 1 to 50 mass % and more preferably from 10 to 40 mass %.

The polymerization initiator used in the polymerization of the monomers is not particularly limited as long as the polymerization initiator can polymerize these monomers and can provide a polymer chain having an active terminal. For example, use of a polymerization initiator having a primary catalyst of an organic alkali metal compound, an organic alkaline earth metal compound, a lanthanide series metal compound, or the like is preferred.

Specific examples of the organic alkali metal compound include organic monolithium compounds such as n-butyllithium, sec-butyllithium, t-butyllithium, hexyl lithium, phenyl lithium, stilbene lithium, and the like; organic poly-lithium compounds such as dilithiomethane, 1,4-dilithiobutane, 1,4-dilithio-2-ethylcyclohexane, 1,3,5-trilithiobenzene, 1,3,5-tris(lithiomethyl)benzene, and the like; organic sodium compounds such as sodium naphthalene and the like; and organic potassium compounds such as potassium naphthalene and the like; and the like.

Examples of the organic alkaline earth metal compound include di-n-butylmagnesium, di-n-hexylmagnesium, diethoxycalcium, calcium distearate, di-t-butoxystrontium, diethoxybarium, diisopropoxybarium, diethylmercapto-barium, di-t-butoxybarium, diphenoxybarium, diethylaminobarium, barium distearate, diketylbarium, and the like.

Examples of the polymerization initiators having a lanthanide series metal compound as a primary catalyst include polymerization initiators having a primary catalyst of a lanthanide series metal salt containing a lanthanide series metal such as lanthanum, cerium, praseodymium, neodymium, samarium, and gadolinium; and containing a carboxylic acid, phosphorus-containing organic acid, and the like, together with a promoter such as an alkylaluminum compound, organoaluminum hydride compound, organoaluminum halide compound, and the like.

Among these polymerization initiators, organic monolithium compounds and organic poly-lithium compounds are preferred, organic monolithium compounds are more preferred, and n-butyllithium is particularly preferred.

The organic alkali metal compound may be used as an organic alkali metal amide compound after first reacting it with a secondary amine such as dibutylamine, dihexylamine, dibenzylamine, pyrrolidine, hexamethyleneimine, and heptamethyleneimine (preferably pyrrolidine, hexamethyleneimine, and heptamethyleneimine).

A single polymerization initiator may be used alone, or a combination of two or more polymerization initiators may be used.

The used amount of polymerization initiator should be determined according to the target molecular weight, but is typically from 1 to 50 mmol, preferably from 2 to 20 mmol, and more preferably from 4 to 15 mmol, per 1000 g of the monomers.

The polymerization temperature when the monomers are polymerized is typically from −80 to +150° C., preferably from 0 to 100° C., and more preferably from 30 to 90° C.

The form of polymerization can be any form such as batch mode and continuous mode. However, in the case where conjugated diene monomers and aromatic vinyl monomers are copolymerized, the batch mode is preferable from the perspective of controlling the randomness of the bonding between the conjugated diene monomer units and the aromatic vinyl monomer units.

In the case where the conjugated diene-based polymer chain having an active terminal contains conjugated diene monomer units and aromatic vinyl monomer units, examples of the form of bonding between the conjugated diene monomer units and the aromatic vinyl monomer units include forms such as block, taper, and random. The random bonding is preferable.

To adjust the vinyl bond content in the conjugated diene monomer units in the conjugated diene-based polymer chain having an active terminal, a polar compound is preferably added to an inert organic solvent at the time of polymerization.

Examples of the polar compound include ether compounds such as dibutylether and tetrahydrofuran; tertiary amines such as tetramethylethylenediamine; alkali metal alkoxides; phosphine compounds; and the like.

Among these, ether compounds and tertiary amines are preferred, tertiary amines are more preferred, and tetramethylethylenediamine is even more preferred.

These polar compounds may be used as a single type or as a combination of two or more types.

The used amount of the polar compound should be determined according to the target vinyl bond content, but is typically from 0.001 to 100 mol, preferably from 0.005 to 50 mol, and more preferably from 0.01 to 30 mol, per 1 mol of the polymerization initiator.

The peak molecular weight of the conjugated diene-based polymer chain having an active terminal detected by gel permeation chromatography (GPC) is preferably 200000 or greater but less than 300000, more preferably 210000 or greater but less than 280000, and even more preferably 220000 or greater but less than 260000.

The peak molecular weight is detected by GPC and determined based on calibration with polystyrene. Furthermore, in the case where a plurality of peaks of the conjugated diene-based polymer chain are observed, the peak molecular weight of the peak with the smallest molecular weight derived from the conjugated diene-based polymer chain detected by GPC is used as the peak molecular weight of the conjugated diene-based polymer chain having an active terminal.

The molecular weight distribution indicated by the ratio (Mw/Mn) of the weight average molecular weight (Mw) to the number average molecular weight (Mn) of the conjugated diene-based polymer chain having an active terminal is preferably from 1.0 to 1.5, more preferably from 1.0 to 1.4, and particularly preferably from 1.0 to 1.3.

Step (A)

The method for manufacturing the composition S includes a step (A) of mixing a solution containing a conjugated diene-based polymer chain having an active terminal, and a silicon compound having 6 or more reaction sites that can react with the active terminal of the conjugated diene-based polymer chain having the active terminal per molecule (hereinafter, simply referred to as "coupling agent").

The coupling agent used in the step (A) is a silicon compound having 6 or more reaction sites that can react with the active terminal of the conjugated diene-based polymer chain having the active terminal per molecule; preferably a silicon compound having from 6 to 9 reaction sites that can react with the active terminal of the conjugated diene-based polymer chain having the active terminal per molecule; more preferably a silicon compound having 6 reaction sites that can react with the active terminal of the conjugated diene-based polymer chain having the active terminal per molecule; and, specifically, particularly preferably a silicon compound represented by General Formula (1) below.

The reaction site is not particularly limited as long as the reaction site can react with an active terminal of the conjugated diene-based polymer chain, and examples thereof include a halogen atom, an alkoxyl group, and the like bonded to a silicon atom.

$$SiL^1_3\text{-}A^1\text{-}SiL^2_3 \quad (1)$$

In General Formula (1), $L^1$ and $L^2$ are each independently a halogen atom or an alkoxyl group having from 1 to 20 carbons, and a plurality of $L^1$ or $L^2$ may be the same or different. $A^1$ is a chemical single bond, a polymethylene group having from 1 to 20 carbons ($(CH_2)_k$ (k is an integer from 1 to 20)), an arylene group having from 6 to 20 carbons, or a cycloalkylene group having from 5 to 20 carbons.

In the silicon compound represented by General Formula (1) above, $A^1$ is preferably a polymethylene group having from 1 to 20 carbons $(CH_2)_k$ (k is an integer from 1 to 20)). Among these, k is more preferably an integer of from 1 to 10 and even more preferably an integer of from 1 to 6.

When both $L^1$ and $L^2$ in General Formula (1) above are halogen atoms, the silicon compound represented by General Formula (1) above is a halogenated silicon compound. In the halogenated silicon compound, $L^1$ and $L^2$ are more preferably chlorine atoms. Meanwhile, when both $L^1$ and $L^2$ in General Formula (1) above are alkoxy groups having from 1 to 20 carbons, the silicon compound represented by General Formula (1) above is an alkoxysilane compound. In the alkoxysilane compound, $L^1$ and $L^2$ are preferably alkoxyl groups having from 1 to 10 carbons, more preferably alkoxyl groups having from 1 to 6 carbons, and, from the perspective of reactivity, even more preferably methoxy group(s) or ethoxy group(s).

Specific examples of the halogenated silicon compound represented by General Formula (1) above include hexachlorodisilane, bis(trichlorosilyl)methane, 1,2-bis(trichlorosilyl) ethane, 1,3-bis(trichlorosilyl)propane, 1,4-bis(trichlorosilyl) butane, 1,5-bis(trichlorosilyl)pentane, 1,6-bis(trichlorosilyl) hexane, and the like. Among these, 1,6-bis(trichlorosilyl) hexane is preferred.

Specific examples of the alkoxysilane compound represented by General Formula (1) above include hexamethoxy disilane, hexaethoxy disilane, bis(trimethoxysilyl)methane, bis(triethoxysilyl)methane, bis(trimethoxysilyl)ethane, bis (triethoxysilyl)ethane, bis(trimethoxysilyl)propane, bis(triethoxysilyl)propane, bis(trimethoxysilyl)butane, bis(triethoxysilyl)butane, bis(trimethoxysilyl)pentane, bis (triethoxysilyl)pentane, bis(trimethoxysilyl)hexane, bis (triethoxysilyl)hexane, bis(trimethoxysilyl)benzene, bis (triethoxysilyl)benzene, bis(trimethoxysilyl)cyclohexane, bis(triethoxysilyl)cyclohexane, bis(3-trimethoxysilylpropyl) ethane, bis(3-triethoxysilylpropyl)ethane, and the like. Among these, bis(trimethoxysilyl)hexane is preferred.

Other examples of the coupling agent include bis(3-triethoxysilylpropyl)methylamine, tris(trimethoxysilylmethyl)amine, and the like. A single coupling agent may be used alone, or a combination of two or more coupling agents may be used.

The used amount of the coupling agent is adjusted based on the range of the coupling ratio described below. The amount by mole of the reaction sites of the coupling agent that reacts with the active terminal of the conjugated diene-based polymer chain is typically from 0.1 to 0.35 mol and preferably from 0.2 to 0.3 mol, per 1 mol of the polymerization initiator used in the polymerization reaction.

Step (B)

The method for manufacturing the composition S includes, in addition to the step (A) described above, a step (B) of mixing a solution containing a conjugated diene-based polymer chain having an active terminal; with a polyorganosiloxane having from 3 to 200 functional groups that can react with the active terminal of the conjugated diene-based polymer chain having the active terminal per molecule (hereinafter, simply referred to as "modifying agent").

The modifying agent used in the step (B) is a polyorganosiloxane having from 3 to 200 functional groups that can react with the active terminal of the conjugated diene-based polymer chain having the active terminal per molecule. The number of the functional groups is preferably from 20 to 150 groups and more preferably from 30 to 120 groups, per one molecule of the polyorganosiloxane.

The functional group is not particularly limited as long as the functional group can react with the active terminal of the conjugated diene-based polymer chain, and examples thereof include an epoxy group, an alkoxyl group, a pyrrolidonyl group, an allyloxy group, a carbonyl group, an isocyanate group, a vinyl group, a halogen atom, and the like. Among these, from the perspective of achieving excellent affinity with silica, an epoxy group, an alkoxyl group, and a pyrrolidonyl group are preferred. Furthermore, from the perspective of achieving excellent processability of the composition according to an embodiment of the present technology, an epoxy group or an alkoxyl group is preferred, and an epoxy group is more preferred.

Specifically, the polyorganosiloxane having from 3 to 200 functional groups that can react with the active terminal of the conjugated diene-based polymer chain having the active terminal per molecule is preferably a polyorganosiloxane represented by General Formula (2) below.

(2)

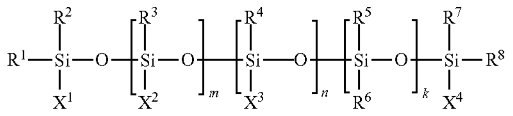

In General Formula (2) above, $R^1$ to $R^8$ are each independently an alkyl group having from 1 to 6 carbons or an aryl group having from 6 to 12 carbons. Each of $X^1$ and $X^4$ is a functional group that can react with the active terminal of the conjugated diene-based polymer chain having the active terminal; or an alkyl group having from 1 to 6 carbons or an aryl group having from 6 to 12 carbons, and $X^1$ and $X^4$ may be the same or different. $X^2$ is each independently a functional group that can react with the active terminal of the conjugated diene-based polymer chain having the active terminal. $X^3$ is a group having from 2 to 20 repeating alkylene glycol units, a portion of the $X^3$ moieties optionally being group(s) derived from a group having from 2 to 20 repeating alkylene glycol units. m is an integer of from 3 to 200, n is an integer of from 0 to 200, and k is an integer of from 0 to 200.

Examples of the alkyl group having from 1 to 6 carbons that constitutes $R^1$ to $R^8$, $X^1$, and $X^4$ include a methyl group, an ethyl group, an n-propyl group, an isopropyl group, a butyl group, a pentyl group, a hexyl group, a cyclohexyl group, and the like. Examples of the aryl groups having from 6 to 12 carbons include a phenyl group, a methylphenyl group, and the like. Among these, a methyl group is preferred from the perspective of ease of manufacturing of the polyorganosiloxane itself.

Preferable examples of the functional group that can react with the active terminal of the conjugated diene-based polymer chain having the active terminal, constituting $X^1$, $X^2$, and $X^4$, include alkoxyl groups having from 1 to 5 carbons, hydrocarbon groups containing a 2-pyrrolidonyl group, and epoxy group-containing groups having from 4 to 12 carbons.

Examples of the alkoxyl group having from 1 to 5 carbons include a methoxy group, an ethoxy group, a propoxy group, an isopropoxy group, a butoxy group, and the like. Among these, a methoxy group is preferred from the perspective of reactivity.

The hydrocarbon group containing 2-pyrrolidonyl group is, for example, represented by General Formula (3).

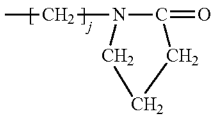

(3)

In General Formula (3) above, j is an integer of from 2 to 10 and is preferably 2.

The epoxy group-containing groups having from 4 to 12 carbons is, for example, represented by General Formula (4).

$$—Z^1—Z^2\text{-}E \quad (4)$$

In General Formula (4), $Z^1$ is an alkylene group having from 1 to 10 carbons or an alkyl arylene group; $Z^2$ is a methylene group, a sulfur atom, or an oxygen atom; and E is an epoxy group-containing hydrocarbon group having from 2 to 10 carbons. Among these, preferably, $Z^2$ is an oxygen atom; more preferably, $Z^2$ is an oxygen atom and E is a glycidyl group; and even more preferably, $Z^1$ is an alkylene group having 3 carbons, $Z^2$ is an oxygen atom, and E is a glycidyl group.

In the polyorganosiloxane represented by General Formula (2), $R^1$ to $R^8$ are each preferably an alkyl group having from 1 to 6 carbons among those described above, $X^1$ and $X^4$ are each preferably an alkyl group having from 1 to 6 carbons among those described above, and $X^2$ is preferably an epoxy group-containing groups having from 4 to 12 carbons among those described above.

In the polyorganosiloxane represented by General Formula (2), $X^3$ (that is, a group having from 2 to 20 repeating alkylene glycol units) is represented by General Formula (5) below, for example.

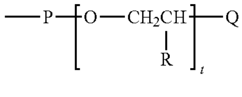

(5)

In General Formula (5) above, t is an integer of from 2 to 20, P is an alkylene group or an alkyl arylene group having from 2 to 10 carbons, R is a hydrogen atom or a methyl group, and Q is an alkoxyl group or an aryloxy group having from 1 to 10 carbons. Among these, preferably, t is an integer of from 2 to 8, P is an alkylene group having three carbons, R is a hydrogen atom, and Q is a methoxy group.

In the polyorganosiloxane represented by General Formula (2), m is an integer of from 3 to 200, preferably from 20 to 150, and more preferably from 30 to 120.

In the polyorganosiloxane represented by General Formula (2), n is an integer of from 0 to 200, preferably from 0 to 150, and more preferably from 0 to 120; k is an integer of from 0 to 200, preferably from 0 to 150, and more preferably from 0 to 120; and the sum of m, n, and k is preferably from 3 to 400, more preferably from 3 to 300, and even more preferably from 3 to 250.

The used amount of the modifying agent is adjusted based on the range of the coupling ratio described below. The amount by mole of the functional group in the modifying agent that reacts with the active terminal of the conjugated diene-based polymer chain is typically from 0.01 to 0.9 mol, preferably from 0.05 to 0.8 mol, and more preferably from 0.1 to 0.5 mol, per 1 mol of the polymerization initiator used in the polymerization reaction.

A single modifying agent may be used alone, or a combination of two or more modifying agents may be used.

In the method for manufacturing the composition S, the method of mixing the solution containing the conjugated diene-based polymer chain having an active terminal, the coupling agent, and the modifying agent is not particularly limited. However, from the perspective of suitably controlling the coupling reaction and the modification reaction, a method in which the coupling agent and the modifying agent are added into the solution containing the conjugated diene-based polymer chain having an active terminal is preferred. At this time, the coupling agent and the modifying agent are preferably dissolved in an inert solvent and added to the polymerization system. The solution concentration is preferably from 1 to 50 mass %.

The timing of adding the coupling agent and/or the modifying agent into the solution containing the conjugated diene-based polymer chain having an active terminal is not particularly limited, but the addition is preferably performed in a condition in which the polymerization reaction is not completed and the solution containing the conjugated diene-based polymer chain having an active terminal also contains monomers. More specifically, the coupling agent and the modifying agent are preferably added into the solution in the condition where the solution containing the conjugated diene-based polymer chain having an active terminal contains at least 100 ppm (more preferably from 300 to 50000 ppm) of the monomers. By adding the coupling agent and/or the modifying agent in this manner, it is possible to control the reaction well by suppressing side reactions between the conjugated diene-based polymer chain having an active terminal and impurities contained in the polymerization system.

As the conditions for reacting the coupling agent and the modifying agent, the reaction temperature is typically from 0 to 100° C. and preferably from 30 to 90° C., and the reaction time of each is typically from 1 minute to 120 minutes and preferably from 2 minutes to 60 minutes.

In the method for manufacturing the composition S, the order of the step (A) and the step (B) is not particularly limited, and either step may be performed first or the steps may be performed at the same time; however, the step (A) is preferably performed before the step (B).

In the method for manufacturing the composition S, a known polymerization terminal modifying agent that can react with the active terminal of the conjugated diene-based polymer chain, other than the coupling agent and the modifying agent described above, may be added to the polymerization system before and/or after the step (A) and the step (B) in the range that does not inhibit the effect of the present technology.

In the method for manufacturing the composition S, a solution containing the composition S containing the modified butadiene rubber can be obtained by, for example, optionally stopping the reaction by adding water or an alcohol, such as methanol or isopropanol, after the coupling agent and/or the modifying agent are reacted to the conjugated diene-based polymer chain having an active terminal.

Next, an anti-aging agent, a crumbling agent, a scale inhibitor, and the like are optionally added to the polymerization solution, then the solvent is separated by direct drying or steam stripping, and the target composition S is recovered.

In the present technology, the composition S obtained in this manner can be considered as the modified butadiene rubber described above.

The area ratio of the peak portion having the peak molecular weight that is at least 2.5 times the peak molecular weight of the peak with the smallest molecular weight detected by gel permeation chromatography (GPC) to the total elution area (hereinafter, also referred to as "coupling ratio") of the modified butadiene rubber is preferably from 25 to 35%.

Herein, "peak with the smallest molecular weight detected by GPC of the modified butadiene rubber" refers to "peak assigned to a polymer having the smallest molecular weight in the polymer contained in the modified butadiene rubber". When the coupling ratio is within the range described above, the resulting composition S becomes less likely to flow and has excellent storage stability. Additionally, the finally obtained tire achieves a superior low heat build-up.

The coupling ratio refers to the proportion of the structure (mass fraction) in which at least 3 conjugated diene-based polymer chains are bonded through residue(s) of the coupling agent and/or the modifying agent after reaction in the modified butadiene rubber. This can be measured by GPC (based on calibration with polystyrene).

The weight average molecular weight of the modified butadiene rubber, in terms of the value measured by GPC based on calibration with polystyrene, is preferably from 200000 to 800000 and more preferably from 300000 to 700000.

The molecular weight distribution represented by the ratio (Mw/Mn) of the weight average molecular weight (Mw) to the number average molecular weight (Mn) of the modified butadiene rubber is preferably from 1.1 to 5.0 and more preferably from 1.2 to 3.0.

The Mooney viscosity ($ML_{1+4}$, 100° C.) of the modified butadiene rubber is preferably from 30 to 75.

The vinyl bond content in the conjugated diene monomer unit part of the modified butadiene rubber is preferably 50 mass % or less and more preferably 25 mass % or less.

Silica

The silica contained in the composition according to an embodiment of the present technology is not particularly limited, and any known silica that is blended in rubber compositions for the use in tires or the like can be used.

Examples of the silica include wet silica, dry silica, fumed silica, diatomaceous earth, and the like. One type of the silica may be used alone, or two or more types of the silicas may be used in combination.

The silica preferably has a cetyltrimethylammonium bromide (CTAB) adsorption specific surface area of, but not particularly limited to, 100 to 300 $m^2/g$ and more preferably 150 to 250 $m^2/g$, from the perspective of exhibiting superior effect of the present technology.

In the present specification, the CTAB adsorption specific surface area is the adsorbed amount of CTAB on the silica surface measured according to JIS K 6217-3:2001 "Part 3: Determination of specific surface area—CTAB adsorption methods".

In the composition according to an embodiment of the present technology, the content of the silica is from 20 to 100 parts by mass per 100 parts by mass of the diene rubber, and from the perspective of achieving superior effect of the present technology, the content is preferably form 30 to 90 parts by mass and more preferably from 50 to 80 parts by mass.

Cured Product (Specific Cured Product)

The cured product contained in the composition according to an embodiment of the present technology is a cured product obtained by curing the crosslinkable oligomer or polymer that is incompatible with the diene rubber and has JIS A hardness of from 3 to 45 (hereinafter, also referred to "specific cured product").

"Incompatible (with the diene rubber)" does not mean being incompatible with all rubber components contained in the diene rubber but means that the specific components used in the crosslinkable oligomer or polymer and the diene rubber are not compatible to each other.

That is, it is sufficient that the crosslinkable oligomer or polymer is incompatible with the component actually contained in the diene rubber, and it is not necessary to be incompatible with the rubber component that is not actually contained in the diene rubber (for example, the "other rubber component" described above). For example, in the case of Examples described below, the diene rubber is formed from a natural rubber and a modified butadiene rubber. Thus, the crosslinkable polymer is only required to be incompatible with the natural rubber and the modified butadiene rubber.

"Cured product obtained by curing" refers to a cured product obtained by curing the crosslinkable oligomer or polymer before the composition according to an embodiment of the present technology is mixed and prepared.

"JIS A hardness" refers to durometer hardness defined by JIS K 6253-3:2012 and the hardness measured at the temperature of 25° C. by a type A durometer.

Crosslinkable Oligomer or Polymer

The crosslinkable oligomer or polymer is not particularly limited as long as the crosslinkable oligomer or polymer is crosslinkable and incompatible with the diene rubber.

"Compatible" means that two (or more) types of different molecular chains are uniformly miscible at the molecular level (completely mixed at the molecular level). Conversely, "incompatible" means not completely compatible at the molecular level.

Examples of the crosslinkable oligomer or polymer include polyether-based, polyester-based, polyolefin-based, polycarbonate-based, aliphatic, saturated hydrocarbon-based, acrylic, plant-derived, or siloxane-based polymers or copolymers; and the like.

Among these, from the perspectives of thermal stability, molecular chain flexibility, hydrolysis resistance, and the like, the crosslinkable oligomer or polymer is preferably a polyether-based or siloxane-based polymer or copolymer.

Examples of the polyether-based polymer or copolymer include polyethylene glycol, polypropylene glycol (PPG), polypropylene triol, ethylene oxide/propylene oxide copolymers, polytetramethylene ether glycol (PTMEG), sorbitol-based polyols, and the like.

Examples of the siloxane-based polymer or copolymer include polymers or copolymers that have a siloxane structure represented by —$(Si(R^1)(R^2)O)$— (wherein, $R^1$ and $R^2$ each independently represent an alkyl group having from 1 to 4 carbons or a phenyl group) in a main chain, and the like.

The crosslinkable oligomer or polymer preferably has a silane functional group because the cured product is easily formed by crosslinking between molecules.

The silane functional group is also referred to as a crosslinkable silyl group. Specific examples thereof include a hydrolyzable silyl group; a silanol group; functional groups in which a silanol group is replaced by an acetoxy group derivative, an enoxy group derivative, an oxime group derivative, an amine derivative, or the like; and the like.

Specific examples of the hydrolyzable silyl group include alkoxysilyl groups, alkenyloxysilyl groups, acyloxysilyl groups, aminosilyl groups, aminoxysilyl groups, oximesilyl groups, amidosilyl groups, and the like.

Among these, from the perspective of achieving excellent balance between hydrolyzability and storage stability, an alkoxysilyl group is preferable. Specifically, an alkoxysilyl group represented by Formula (X) below is more preferable, and a methoxysilyl group or ethoxysilyl group is even more preferable.

(X)

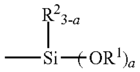

In Formula (X), $R^1$ represents an alkyl group having from 1 to 4 carbons, $R^2$ represents a hydrogen atom or an alkyl group having from 1 to 4 carbons, and a represents an integer of from 1 to 3. When a is 2 or 3, the plurality of $R^1$ may be the same or different. When a is 1, the plurality of $R^1$ may be the same or different.

The silane functional group is preferably contained at least at a terminal of the main chain of the crosslinkable oligomer or polymer, and when the main chain is a straight chain, 1.5 or more reactive functional groups are preferably contained, and 2 or more reactive functional groups are more preferably contained. On the other hand, when the main chain is branched, 3 or more reactive functional groups are preferably contained.

From the perspectives of achieving excellent dispersibility of the resulting cured product in the diene rubber and/or kneading processability of the rubber composition, the weight average molecular weight or the number average molecular weight of the crosslinkable oligomer or polymer is preferably from 300 to 30000 and more preferably from 2000 to 20000.

The weight average molecular weight and the number average molecular weight are both measured by gel permeation chromatography (GPC) based on calibration with polystyrene standard.

The curing method of curing the crosslinkable oligomer or polymer is not particularly limited, and examples thereof include a method for curing by using at least one type of catalyst selected from the group consisting of acid catalysts, alkali catalysts, metal catalysts, and amine catalysts, and the like.

Among these, a method for curing by using an acid catalyst or a metal catalyst is preferable from the perspective of high curing efficiency.

Specific examples of the acid catalyst include lactic acid, phthalic acid, lauryl acid, oleic acid, linoleic acid, linolenic acid, naphthenic acid, octenoic acid, octylic acid (2-ethylhexanoic acid), formic acid, acetic acid, propionic acid, butyric acid, valeric acid, caproic acid, caprylic acid, capric acid, lauric acid, myristic acid, benzoic acid, oxalic acid, malic acid, citric acid, and the like. One of these may be used alone, or two or more types of these may be used in combination.

From the perspectives of acidity and dispersibility, as the acid catalyst, an acid that is liquid at room temperature is preferably used, and specifically, lactic acid and formic acid are more preferably used.

Examples of the metal catalyst include organometallic compounds such as tin octylate, alkali metal alcoholates, and the like.

Specific examples of the metal catalyst include tin carboxylates such as dimethyltin dilaurate, dibutyltin dilaurate, dibutyltin maleate, dibutyltin diacetate, tin octylate, and tin naphthenate; titanate esters such as tetrabutyl titanate and tetrapropyl titanate; organic aluminum compounds such as aluminum tris-acetylacetonate, aluminum tris-ethyl acetoacetate, and diisopropoxyaluminum ethyl acetoacetate; chelate compounds such as zirconium tetra-acetylacetonate and titanium tetra-acetylacetonate; metal octanoates such as lead octanoate and bismuth octanoate; and the like.

From the perspective of acidity, tin carboxylates are more preferably used as the metal catalyst.

The hardness of the cured product is, in terms of JIS A hardness, from 3 to 45, preferably from 3 to 20, and more preferably from 3 to 15.

The average particle diameter of the cured product in the composition according to an embodiment of the present technology prepared by mixing the cured product is preferably from 5 to 250 μm from the perspectives of achieving excellent dispersibility in the diene rubber and better performance on ice and wear resistance of the studless tire.

The average particle diameter of the cured product of the composition according to an embodiment of the present technology is a value obtained by image analysis of a cross-section of a vulcanized test sample of the composition according to an embodiment of the present technology by using an electron microscope (magnification: approximately from 500 to 2000) and then, for any 10 or more particles, measuring and averaging of the maximum lengths of the particles of the observed cured product.

In the composition according to an embodiment of the present technology, the content of the cured product is from 0.3 to 30 parts by mass per 100 parts by mass of the diene rubber, and from the perspective of achieving superior effect of the present technology, the content is preferably form 0.5 to 25 parts by mass and more preferably from 1 to 15 parts by mass.

Optional Component

The composition according to an embodiment of the present technology may further contain another component (optional component) as necessary within the scope that does not impair the effect or purpose thereof.

Examples of the optional component include various additives that are typically used in rubber compositions, such as carbon black, silane coupling agents, aromatic modified terpene resins, thermally expanding microcapsules, fillers, zinc oxide (flowers of zinc), stearic acid, anti-aging agents, waxes, processing aids, oils, liquid polymers, thermosetting resins, vulcanizing agents (for example, sulfur), and vulcanization accelerators.

Aromatic Modified Terpene Resin

The composition according to an embodiment of the present technology may further contain an aromatic modified terpene resin.

From the perspective of achieving superior effect of the present technology, the aromatic modified terpene resin is preferably an aromatic modified terpene resin having a softening point of from 60 to 150° C. From the perspective of achieving superior effect of the present technology, the softening point is more preferably from 100 to 140° C.

Note that the softening point is a Vicat softening point measured in accordance with JIS K 7206:1999.

In the composition according to an embodiment of the present technology, the content of the aromatic modified terpene resin is not particularly limited; however, from the perspective of achieving superior effect of the present technology, the content is preferably from 2 to 20 parts by mass and more preferably from 5 to 15 parts by mass, per 100 parts by mass of the diene rubber.

Thermally Expanding Microcapsule

The composition according to an embodiment of the present technology may further contain thermally expanding microcapsules.

The thermally expanding microcapsules are heat-expandable thermoplastic resin particles, in which a liquid that vaporizes by heat and generates a gas is included in a thermoplastic resin. These thermally expanding microcapsules are expanded by heating at a temperature equal to or higher than the expansion starting temperature, typically at a temperature of from 130 to 190° C., and entrap a gas in the outer shell formed from the thermoplastic resin to form gas-encapsulating thermoplastic resin particles.

In the thermoplastic resin, the expansion starting temperature of the thermoplastic resin is preferably 100° C. or higher and more preferably 120° C. or higher. The maximum expansion temperature is preferably 150° C. or higher and more preferably 160° C. or higher.

As the thermoplastic resin, for example, a polymer of (meth)acrylonitrile and a copolymer having a high (meth) acrylonitrile content are suitably used. In the case of the copolymer, monomers such as vinyl halide, vinylidene halide, styrene-based monomers, (meth)acrylate-based monomers, vinyl acetate, butadiene, vinylpyridine, chloroprene, and the like are used as another monomer (comonomer).

The thermoplastic resin may be crosslinkable with a crosslinking agent, such as divinylbenzene, ethylene glycol di(meth)acrylate, triethylene glycol di(meth)acrylate, trimethylolpropane tri(meth)acrylate, 1,3-butylene glycol di(meth)acrylate, allyl(meth)acrylate, triacrylformal, and triallyl isocyanurate. The form of crosslinking is preferably uncrosslinked but may be partially crosslinked to a degree that does not impair the characteristics as the thermoplastic resin.

Examples of the liquid that vaporizes by heat and generates a gas include liquids such as hydrocarbons, such as n-pentane, isopentane, neopentane, butane, isobutane, hexane, and petroleum ether; and chlorinated hydrocarbons such as methyl chloride, methylene chloride, dichloroethylene, trichloroethane, and trichloroethylene.

The thermally expanding microcapsules described above are not particularly limited as long as the thermally expanding microcapsules are thermally expanding microcapsules that expand by heat to form gas-encapsulating thermoplastic resin. One type of the thermally expanding microcapsules may be used alone, or two or more types of the thermally expanding microcapsules may be used in combination.

The particle diameter before expansion of the thermally expanding microcapsule is preferably from 5 to 300 μm and more preferably from 10 to 200 μm.

As the thermally expanding microcapsules, commercially available products can be used. Specific examples thereof include Expancel 091DU-80 and Expancel 092DU-120, available from Expancel; Microsphere F-85 and Microsphere F-100, available from Matsumoto Yushi-Seiyaku Co., Ltd.; and the like.

In the composition according to an embodiment of the present technology, the content of the thermally expanding microcapsules is not particularly limited but is preferably from 0.5 to 20 parts by mass and more preferably from 1 to 10 parts by mass, per 100 parts by mass of the diene rubber.

Carbon Black

The composition according to an embodiment of the present technology may further contain carbon black.

The carbon black is not particularly limited and, for example, carbon blacks of various grades, such as SAF-HS (super abrasion furnace—high structure), SAF (super abrasion furnace), ISAF-HS (intermediate super abrasion furnace—high structure), ISAF (intermediate super abrasion furnace), ISAF-LS (intermediate super abrasion furnace—low structure), IISAF-HS (intermediate ISAF—high structure), HAF-HS (high abrasion furnace—high structure), HAF (high abrasion furnace), HAF-LS (high abrasion furnace—low structure), and FEF (fast extruding furnace), can be used.

The nitrogen adsorption specific surface area ($N_2SA$) of the carbon black is not particularly limited but is preferably from 50 to 200 $m^2/g$ and more preferably from 70 to 150 $m^2/g$, from the perspective of achieving superior effect of the present technology.

The nitrogen adsorption specific surface area ($N_2SA$) is a value of the amount of nitrogen adsorbed to the surface of carbon black, measured in accordance with JIS K 6217-2: 2001 (Part 2: Determination of specific surface area—Nitrogen adsorption methods—Single-point procedures).

The content of the carbon black is not particularly limited but is preferably from 1 to 200 parts by mass and more preferably from 10 to 100 parts by mass, per 100 parts by mass of the diene rubber described above.

Silane Coupling Agent

The composition according to an embodiment of the present technology may further contain a silane coupling agent.

The silane coupling agent is not particularly limited as long as the silane coupling agent is a silane compound containing a hydrolyzable group and an organic functional group.

The hydrolyzable group is not particularly limited; however, examples thereof include alkoxy groups, phenoxy groups, carboxyl groups, and alkenyloxy groups. Among these, alkoxy groups are preferable. When the hydrolyzable group is an alkoxy group, the number of carbon atoms of the alkoxy group is preferably from 1 to 16 and more preferably from 1 to 4. Examples of the alkoxy group having from 1 to 4 carbons include a methoxy group, ethoxy group, and propoxy group.

The organic functional group is not particularly limited but is preferably a group that can form a chemical bond with an organic compound. Examples thereof include an epoxy group, a vinyl group, an acryloyl group, a methacryloyl group, an amino group, a mercapto group, and the like. Among these, a mercapto group is preferred.

One type of the silane coupling agents may be used alone, or two or more types of the silane coupling agents may be used in combination.

The silane coupling agent is preferably a sulfur-containing silane coupling agent.

Specific examples of the silane coupling agent include bis(3-triethoxysilylpropyl)tetrasulfide, bis(3-trimethoxysilylpropyl)tetrasulfide, bis(3-triethoxysilylpropyl)disulfide, mercaptopropyltrimethoxysilane, mercaptopropyltriethoxysilane, 3-trimethoxysilylpropyl-N,N-dimethylthiocarbamoyl-tetrasulfide, trimethoxysilylpropyl-mercaptobenzothiazole tetrasulfide, triethoxysilylpropyl-methacrylate-monosulfide, dimethoxymethylsilylpropyl-N,N-dimethylthiocarbamoyl-tetrasulfide, and the like. One type of these may be used alone, or two or more types of these may be used in combination.

In the composition according to an embodiment of the present technology, the content of the silane coupling agent is not particularly limited but is preferably from 2 to 20 mass % and more preferably from 5 to 15 mass %, relative to the content of the silica described above.

Method for Manufacturing Rubber Composition for Tire Tread

The method of producing the composition according to an embodiment of the present technology is not particularly limited, and specific examples thereof include a method whereby each of the above-mentioned components is kneaded using a publicly known method and device (e.g. Banbury mixer, kneader, and roll).

When the composition according to an embodiment of the present technology contains a sulfur or a vulcanization accelerator, the components other than the sulfur and the vulcanization accelerator are preferably blended first at a high temperature (preferably from 100 to 155° C.) and then cooled before the sulfur or the vulcanization accelerator is blended.

The composition according to an embodiment of the present technology can be vulcanized or crosslinked under known vulcanizing or crosslinking conditions.

Since the composition according to an embodiment of the present technology achieves excellent performance on ice, wet grip performance, low heat build-up, and wear resistance, the composition is particularly preferable for a studless tire.

Pneumatic Tire

The pneumatic tire according to an embodiment of the present technology is a pneumatic tire using the composition described in an embodiment of the present technology. Moreover, the pneumatic tire according to an embodiment of the present technology is preferably a pneumatic tire using the composition described in an embodiment of the present technology in the tread.

FIG. 1 is a partial cross-sectional schematic view of a tire that represents a pneumatic tire according to an embodiment of the present technology, but the present technology is not limited to the embodiment illustrated in FIG. 1.

In FIG. 1, reference sign 1 denotes a bead portion, reference sign 2 denotes a sidewall portion, and reference sign 3 denotes a tire tread portion.

A carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire periphery of the tire on the outer side of the carcass layer 4.

Rim cushions 8 are provided in portions of the bead portions 1 that are in contact with a rim.

The tire tread portion 3 is formed from the composition described in an embodiment of the present technology described above.

The pneumatic tire according to an embodiment of the present technology can be produced, for example, in accordance with a known method. In addition to ordinary air or air with an adjusted oxygen partial pressure, inert gases such as nitrogen, argon, and helium can be used as the gas with which the tire is filled.

EXAMPLES

The present technology is described below in detail using examples, but the present technology is not limited to such examples.

Synthesis of Modified Butadiene Rubber 1

In a nitrogen atmosphere, 5670 g of cyclohexane, 700 g of 1,3-butadiene, and 0.17 mmol of tetramethylethylenediamine were charged in an autoclave equipped with a stirrer. Then, n-butyllithium in an amount that was required for neutralizing impurities that inhibit polymerization and that were contained in the cyclohexane and the 1,3-butadiene was added, then 8.33 mmol of n-butyllithium was further added for use in the polymerization reaction, and the polymerization was initiated at 50° C. Twenty minutes after polymerization was initiated, 300 g of 1,3-butadiene was continuously added over the course of 30 minutes. The maximum temperature during the polymerization reaction was 80° C. After the continuous addition was completed, the polymerization reaction was continued for an additional 15 minutes. After it was confirmed that the polymer conversion rate was in the range of from 95% to 100%, a small amount of the polymerization solution was sampled. The small amount of the sampled polymerization solution was air-dried, after the reaction was terminated by adding an excess amount of methanol, to acquire a polymer. This polymer was used as a sample for GPC analysis. The peak molecular weight and the molecular weight distribution of the polymer (corresponding to the conjugated diene-based polymer chain having an active terminal) were measured by using the sample, and the peak molecular weight was 230000, and the molecular weight distribution was 1.04.

Immediately after the small amount of the polymerization solution was sampled, to the polymerization solution, 0.288 mmol of 1,6-bis(trichlorosilyl)hexane (corresponding to an amount by mole that was 0.0345 times the amount of the n-butyllithium used in the polymerization) was added in the state of a 40 wt. % cyclohexane solution and reacted for 30 minutes.

Furthermore, 0.0382 mmol (corresponding to an amount by mole that was 0.00459 times the amount of the n-butyllithium used in the polymerization) of polyorganosiloxane A represented by Formula (6) below (the values of m and k were average values) was then added in the state of a 20 wt. % xylene solution and reacted for 30 minutes.

After that, methanol in an amount equivalent to twice the amount by mole of the n-butyllithium used was added as a polymerization terminator. By this, a solution containing a modified butadiene rubber 1 was obtained. To this solution, 0.2 parts of 2,4-bis(n-octylthiomethyl)-6-methylphenol per 100 parts of the rubber component was added as an anti-aging agent. Then, the solvent was removed by steam stripping, and vacuum drying was performed at 60° C. for 24 hours to obtain a solid modified butadiene rubber 1 (composition S). For this modified butadiene rubber 1 (composition S), the weight average molecular weight, the molecular weight distribution, the coupling ratio, the vinyl bond content, and the Mooney viscosity were measured. The weight average molecular weight was 510000, the molecular weight distribution was 1.46, the coupling ratio was 28%, the vinyl bond content was 11 mass %, and the Mooney viscosity was 46.

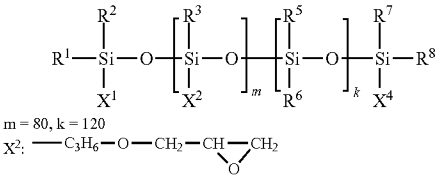

m = 80, k = 120
$X^2$: —$C_3H_6$—O—$CH_2$—CH—$CH_2$
                              \O/
$X^1$, $X^4$, $R^1$~$R^3$, $R^5$~$R^8$: —$CH_3$

Synthesis of Modified Butadiene Rubber 2

In a nitrogen atmosphere, 0.112 mol of 3-aminopropyltrimethoxysilane and 0.123 mol of methyl isopropyl ketone were agitated at room temperature for 2 days. A ketimine silane condensation product having an average degree of condensation of 2.4 was synthesized by removing methanol and unreacted methyl isopropyl ketone from the obtained reaction solution under vacuum.

In a 10 L autoclave reactor in which nitrogen was purged, cyclohexane, 9.215 mol of butadiene, and 5.464 mol of 1,1,4,4-tetramethylethylenediamine were charged, and agitation was started. After adjusting the temperature of the contents in the reactor to 50° C., 4.856 mol of n-butyllithium was added. After the polymer conversion rate reached 100%, a toluene solution of the ketimine silane condensation product synthesized as described above was added and agitated for 1 hour. Then, 0.5 mL of methanol was added thereto and agitated for 30 minutes. In the obtained polymer solution, a small amount of an anti-aging agent (Irganox 1520, available from Ciba Specialty Chemicals) was added, and the solvent was removed by concentration under reduced pressure. The polymer was coagulated in methanol, washed, and then dried to obtain a solid modified butadiene rubber 2.

Synthesis of Specific Cured Product

To 10 parts by mass of a paste-like product of polyoxypropylene glycol capped at a terminal with a hydrolyzable silyl group (polypropylene glycol having a hydrolyzable silyl group at a terminal) (MS Polymer S810, available from Kaneka Corporation) (crosslinkable polymer), 0.1 parts by mass of lactic acid (acid catalyst) was added.

After the mixture was sufficiently agitated, the mixture was cured at room temperature for 2 days to synthesize a specific cured product.

The JIS A hardness of the obtained specific cured product 1 was 8. Furthermore, the average particle diameter of the specific cured product in the vulcanized rubber test piece described below was 38 μm.

Preparation of Rubber Composition for Tire Tread

The components shown in Table 1 below were blended at the proportions (part by mass) shown in Table 1.

Specifically, a master batch was obtained by first heating, to a temperature near 150° C., the components shown in Table 1, excluding the sulfur and the vulcanization accelerator, for 5 minutes in a 1.7 L closed-type Banbury mixer and then discharging the mixture and cooling it to room temperature. Furthermore, the sulfur and the vulcanization accelerator were mixed into the obtained master batch using the Banbury mixer described above to obtain a rubber composition for a tire tread.

Evaluation
Processability (Viscosity)

The obtained rubber composition for a tire tread was subjected to measurement in accordance with JIS K 6300 using an L-type rotor (diameter: 38.1 mm; thickness: 5.5 mm) in a Mooney viscometer under the conditions of a preheating time of 1 minute, a rotor rotation time of 4 minutes, 100° C., and 2 rpm. The obtained result was shown as an index value with the value of Standard Example 1 expressed as an index value of 100. A smaller index value indicates a lower viscosity and superior molding processability. This index value is preferably 115 or less.

Furthermore, the obtained rubber composition for a tire tread was press-vulcanized in a predetermined mold at 170° C. for 10 minutes to prepare a vulcanized rubber test sample. The following evaluations were then performed on the obtained vulcanized rubber test pieces.

Performance on Ice

The vulcanized rubber test sample was attached to a substrate rubber in the form of a flat column and the coefficient of friction on ice was determined by an inside drum-type friction on ice tester under conditions of a measurement temperature of −1.5° C., a load of 5.5 kg/cm³, and a rotation speed of drum of 25 km/hr.

The results are shown in Table 1 ("Performance on ice" row in Table 1). The result was shown as an index value with the coefficient of friction on ice of Standard Example expressed as an index value of 100. A larger index value indicates a greater friction between the rubber and the ice and superior performance on ice of a formed tire.

tan δ (0° C.)

The value of tan δ (0° C.) was measured for the vulcanized rubber test sample with an elongation deformation strain of 10%±2%, a vibration frequency of 20 Hz, and a temperature of 0° C. using a viscoelastic spectrometer (available from Toyo Seiki Seisaku-sho, Ltd.) in accordance with JIS K 6394:2007.

The results are shown in Table 1 ("tan δ (0° C.)" row in Table 1). The result was shown as an index value with the tan δ (0° C.) of Standard Example expressed as an index value of 100. A larger index value indicates a greater tan δ (0° C.), which indicates excellent wet grip performance of a formed tire.

tan δ (60° C.)

The tan δ (60° C.) of the vulcanized rubber test sample was measured in accordance with the same procedure as that for tan δ (0° C.) described above except for performing the measurement at the temperature of 60° C. instead of 0° C.

The result (reciprocal of tan δ (60° C.)) is shown in Table 1 ("tan δ (60° C.)" row in Table 1). The result was shown as an index value with the reciprocal of the tan δ (60° C.) of Standard Example expressed as an index value of 100. A larger index value indicates a smaller tan δ (60° C.), which indicates a superior low heat build-up when a tire is formed.

Wear Resistance

For the vulcanized rubber test sample, wear resistance test was performed in accordance with JIS K 6264-2:2005 using a Lambourn abrasion test machine (available from Iwamoto Seisakusho Co. Ltd.) under the following conditions to measure wear mass:applied force: 4.0 kg/cm³ (=39 N); slip rate: 30%; duration of wear resistance test: 4 minutes; and test temperature: room temperature. The index was then calculated as described below. The results are shown in Table 1. A larger index value indicates a smaller wear amount and excellent wear resistance.

Index value=(wear mass of test sample of Standard Example/wear mass for each example)×100

TABLE 1

| | Reference Example | Comparative Example | | | | | |
|---|---|---|---|---|---|---|---|
| | 1 | 1 | 2 | 3 | 4 | 5 | 6 |
| Natural rubber | 45 | 45 | 45 | 45 | 45 | 45 | 45 |
| Comparative butadiene rubber | 55 | | 55 | 55 | 55 | 55 | |
| Modified butadiene rubber 1 | | 55 | | | | | 55 |
| Modified butadiene rubber 2 | | | | | | | |
| Carbon black | 15 | 15 | 15 | 15 | 15 | 5 | 65 |
| Silica | 65 | 65 | 65 | 65 | 65 | 75 | 15 |
| Silane coupling agent | 4.55 | 4.55 | 4.55 | 4.55 | 4.55 | 5.25 | 4.55 |
| Aroma oil | 42 | 42 | 42 | 30 | 30 | 30 | 30 |
| Specific cured product | | | 6.00 | | 6.00 | 6.00 | 6.00 |
| Aromatic modified terpene resin | | | | 12 | 12 | 12 | 12 |
| Thermally expanding microcapsule | 4.00 | 4.00 | 4.00 | 4.00 | 4.00 | 4.00 | 4.00 |
| Sulfur | 1.60 | 1.60 | 1.60 | 1.60 | 1.60 | 1.60 | 1.60 |
| Stearic acid | 2.00 | 2.00 | 2.00 | 2.00 | 2.00 | 2.00 | 2.00 |
| Zinc oxide | 4.00 | 4.00 | 4.00 | 4.00 | 4.00 | 4.00 | 4.00 |
| Vulcanization accelerator 1 | 2.20 | 2.20 | 2.20 | 2.20 | 2.20 | 2.20 | 2.20 |
| Vulcanization accelerator 2 | 1.80 | 1.80 | 1.80 | 1.80 | 1.80 | 1.80 | 1.80 |
| Performance on ice | 100 | 98 | 120 | 100 | 120 | 120 | 109 |
| tan δ (0° C.) | 100 | 101 | 98 | 110 | 109 | 115 | 82 |
| tan δ (60° C.) | 100 | 101 | 95 | 98 | 93 | 93 | 95 |
| Wear resistance | 100 | 104 | 100 | 98 | 99 | 95 | 100 |
| Processability (viscosity) | 100 | 108 | 98 | 102 | 100 | 105 | 89 |

| | Example | | | | |
|---|---|---|---|---|---|
| | 1 | 2 | 3 | 4 | 5 |
| Natural rubber | 45 | 45 | 45 | 45 | 45 |
| Comparative butadiene rubber | | | | | |
| Modified butadiene rubber 1 | 55 | 55 | 55 | 55 | |
| Modified butadiene rubber 2 | | | | | 55 |
| Carbon black | 15 | 5 | 5 | 40 | 15 |
| Silica | 65 | 75 | 75 | 40 | 65 |
| Silane coupling agent | 4.55 | 5.25 | 5.25 | 5.25 | 4.55 |
| Aroma oil | 30 | 30 | 42 | 30 | 30 |
| Specific cured product | 6.00 | 6.00 | 6.00 | 6.00 | 6.00 |
| Aromatic modified terpene resin | 12 | 12 | | 12 | 12 |
| Thermally expanding microcapsule | 4.00 | 4.00 | 4.00 | 4.00 | 4.00 |
| Sulfur | 1.60 | 1.60 | 1.60 | 1.60 | 1.60 |
| Stearic acid | 2.00 | 2.00 | 2.00 | 2.00 | 2.00 |
| Zinc oxide | 4.00 | 4.00 | 4.00 | 4.00 | 4.00 |
| Vulcanization accelerator 1 | 2.20 | 2.20 | 2.20 | 2.20 | 2.20 |
| Vulcanization accelerator 2 | 1.80 | 1.80 | 1.80 | 1.80 | 1.80 |
| Performance on ice | 132 | 132 | 132 | 115 | 127 |
| tan δ (0° C.) | 122 | 135 | 106 | 105 | 126 |
| tan δ (60° C.) | 100 | 100 | 100 | 100 | 100 |
| Wear resistance | 107 | 100 | 109 | 101 | 105 |
| Processability (viscosity) | 107 | 111 | 110 | 103 | 123 |

Details of the components listed in Table 1 are as follows.

Natural rubber: TSR20 (natural rubber, Tg: −62° C.)

Comparative butadiene rubber: NIPOL BR 1220 (unmodified BR, available from Zeon Corporation)

Modified butadiene rubber 1: Modified butadiene rubber 1 synthesized as described above Modified butadiene rubber 2: Modified butadiene rubber 2 synthesized as described above Carbon black: Show Black N339 (available from Cabot Japan K.K.)

Silica: ZEOSIL 1165MP (CTAB adsorption specific surface area: 159 $m^2/g$, available from Rhodia)

Silane coupling agent: Si69 (bis(3-triethoxysilylpropyl) tetrasulfide; available from Evonik Degussa)

Aroma oil: Extract No. 4S (available from Showa Shell Sekiyu K.K.)

Specific cured product: Specific cured product synthesized as described above

Aromatic modified terpene resin: YS Resin TO-125 (softening point: 125±5° C., available from Yasuhara Chemical Co., Ltd.)

Thermally expanding microcapsules: Microsphere F100 (available from Matsumoto Yushi-Seiyaku Co., Ltd.)

Sulfur: "Golden Flower" oil-treated sulfur powder (sulfur content: 95.24 mass %, available from Tsurumi Chemical Industry Co., Ltd.)

Stearic acid: Beads stearic acid (available from NOF Corporation)

Zinc oxide: Zinc Oxide III (available from Seido Chemical Industry
Co., Ltd.)

Vulcanization accelerator 1: NOCCELER CZ-G (available from Ouchi Shinko Chemical Industrial Co., Ltd.)

Vulcanization accelerator 2: Soxinol D-G (available from Sumitomo Chemical Co., Ltd.)

As shown in Table 1 above, Examples 1 to 5, in which the modified butadiene rubber and the specific cured product were used in combination, exhibited excellent performance on ice, wet grip performance, low heat build-up, and wear resistance.

When Example 2 and Example 3 were compared, Example 2 containing the aromatic modified terpene resin exhibited superior wet grip performance.

When Examples 1 to 4 were compared, Examples 1 to 3, in which the content of silica was 50 parts by mass or greater, exhibited superior performance on ice and wet grip performance.

When Examples 1 to 4 and Example 5 were compared, Examples 1 to 4, which used the modified butadiene rubber 1 in which the polyorganosiloxane group was bonded to the butadiene chain through the hydrocarbon-based linking group (or hydrocarbon-based linking group and silicon-containing linking group) in the modified butadiene rubber, exhibited superior processability.

Meanwhile, Standard Example 1 and Comparative Examples 1 to 5, in which the modified butadiene rubber and the specific cured product were not used in combination; and Comparative Example 6, in which the content of the silica was less than 20 parts by mass although the modified butadiene rubber and the specific cured product were used in combination, resulted in at least one of performance on ice, wet grip performance, a low heat build-up, or wear resistance being insufficient.

The invention claimed is:

1. A rubber composition for a tire tread comprising: a diene rubber, silica, and a cured product;

a content of the silica being from 20 to 100 parts by mass per 100 parts by mass of the diene rubber, a content of the cured product being from 0.3 to 30 parts by mass per 100 parts by mass of the diene rubber;

the diene rubber containing a natural rubber and a modified butadiene rubber having a polyorganosiloxane group at a terminal, a content of the natural rubber in the diene rubber being from 30 to 90 mass %, a content of the modified butadiene rubber in the diene rubber being from 10 to 70 mass %; and the cured product being a cured product obtained by curing a crosslinkable oligomer or polymer that is incompatible with the diene rubber, JIS A hardness of the cured product being from 3 to 45, wherein the polyorganosiloxane group is a group bonded to a terminal of a butadiene chain as a main chain of the modified butadiene rubber through a linking group formed from a divalent hydrocarbon group from 1 to 20 carbons which may have a substituent;

the butadiene chain contains from 85 to 100 mass % of butadiene units;

a part of —$CH_2$— of the linking group formed from a divalent hydrocarbon group from 1 to 20 carbons which may have a substituent may be replaced by —O—;

a silicon-containing linking group represented by General Formula (Si) below is present in between the linking group formed from a divalent hydrocarbon group from 1 to 20 carbons which may have a substituent; and the terminal of the butadiene chain;

$$*1\text{-}Q^1\text{-}Si(R^{L1})_2\text{-}A^1\text{-}Si(R^{L2})_2\text{-}Q^2\text{-}*2 \qquad (Si)$$

wherein, $Q^1$ and $Q^2$ are each independently a chemical single bond or —O—;

$R^{L1}$ and $R^{L2}$ are each independently a substituent, and a plurality of $R^{L1}$ and $R^{L2}$ may be the same or different;

$A^1$ is a chemical single bond, a polymethylene group having from 1 to 20 carbons represented by $(CH_2)_k$ wherein k is an integer from 1 to 20, an arylene group having from 6 to 20 carbons, or a cycloalkylene group having from 5 to 20 carbons;

*1 is a linkage position with *2 in another silicon-containing linking group or with the linking group formed from a divalent hydrocarbon group from 1 to 20 carbons which may have a substituent; and

*2 is a linkage position with *1 in another silicon-containing linking group or with the terminal of the butadiene chain.

2. The rubber composition for a tire tread according to claim 1, wherein the cured product contains particles having an average particle diameter of from 5 to 250 μm.

3. The rubber composition for a tire tread according to claim 2, wherein the crosslinkable oligomer or polymer is a polyether-based or siloxane-based polymer or copolymer and has a silane functional group.

4. The rubber composition for a tire tread according to claim 2, further comprising an aromatic modified terpene resin having a softening point of from 60 to 150° C., wherein a content of the aromatic modified terpene resin is from 2 to 20 parts by mass per 100 parts by mass of the diene rubber.

5. The rubber composition for a tire tread according to claim 1, wherein the crosslinkable oligomer or polymer is a polyether-based or siloxane-based polymer or copolymer and has a silane functional group.

6. The rubber composition for a tire tread according to claim 5, further comprising an aromatic modified terpene resin having a softening point of from 60 to 150° C., wherein a content of the aromatic modified terpene resin is from 2 to 20 parts by mass per 100 parts by mass of the diene rubber.

7. The rubber composition for a tire tread according to claim 1, further comprising an aromatic modified terpene resin having a softening point of from 60 to 150° C., wherein a content of the aromatic modified terpene resin is from 2 to 20 parts by mass per 100 parts by mass of the diene rubber.

8. The rubber composition for a tire tread according to claim 1, further comprising thermally expanding microcapsules, wherein a content of the thermally expanding microcapsules is from 0.5 to 20 parts by mass per 100 parts by mass of the diene rubber.

9. The rubber composition for a tire tread according to claim 1, wherein the butadiene chain contains from 70 to 100 mass % of conjugated diene monomer units.

10. The rubber composition for a tire tread according to claim 9, wherein the cured product contains particles having an average particle diameter of from 5 to 250 μm.

11. The rubber composition for a tire tread according to claim 9, wherein the crosslinkable oligomer or polymer is a polyether-based or siloxane-based polymer or copolymer and has a silane functional group.

12. The rubber composition for a tire tread according to claim 9, further comprising an aromatic modified terpene resin having a softening point of from 60 to 150° C., wherein a content of the aromatic modified terpene resin is from 2 to 20 parts by mass per 100 parts by mass of the diene rubber.

13. The rubber composition for a tire tread according to claim 1, wherein the butadiene chain is a homopolymer chain of conjugated diene monomers.

14. The rubber composition for a tire tread according to claim 13, wherein the cured product contains particles having an average particle diameter of from 5 to 250 μm.

15. The rubber composition for a tire tread according to claim 13, wherein the crosslinkable oligomer or polymer is a polyether-based or siloxane-based polymer or copolymer and has a silane functional group.

16. A pneumatic tire comprising the rubber composition for a tire tread described in claim 1 in a tread.

* * * * *